United States Patent
Proteau et al.

(10) Patent No.: US 6,203,110 B1
(45) Date of Patent: Mar. 20, 2001

(54) SEAT BELT ADJUSTER

(76) Inventors: Judy P. Proteau, deceased, late of Emeryville; by Penny L. Proteau, executrix, c/o Eric R. Proteau, 8 Admiral Dr. Apt. 242; Eric R. Proteau, 8 Admiral Dr., Apt. 242, both of Emeryville, all of CA (US) 94608

( * ) Notice: Subject to any disclaimer, the term of this patent is extended or adjusted under 35 U.S.C. 154(b) by 0 days.

(21) Appl. No.: 09/379,683

(22) Filed: Aug. 24, 1999

Related U.S. Application Data

(63) Continuation-in-part of application No. 09/143,937, filed on Aug. 31, 1998, now abandoned.

(51) Int. Cl.$^7$ .................................................... A47C 31/00
(52) U.S. Cl. ............................................. 297/483; 297/482
(58) Field of Search .............................. 297/483, DIG. 6, 297/485, 464, 482; 280/808

(56) References Cited

U.S. PATENT DOCUMENTS

| | | |
|---|---|---|
| D. 360,288 | 7/1995 | Freeman et al. . |
| 579,818 * | 3/1897 | Cooley . |
| 3,713,693 | 1/1973 | Cadiou . |
| 4,004,583 * | 1/1977 | Johnson . |
| 4,826,250 | 5/1989 | Ibanez . |
| 4,832,367 | 5/1989 | Lisenby . |
| 4,938,535 * | 7/1990 | Condon et al. . |
| 5,042,838 | 8/1991 | Carter . |
| 5,080,396 | 1/1992 | Vacanti . |
| 5,081,714 * | 1/1992 | Liu . |
| 5,135,257 | 8/1992 | Short . |
| 5,154,446 | 10/1992 | Blake . |
| 5,178,439 | 1/1993 | McCracken . |
| 5,201,099 | 4/1993 | Campbell . |
| 5,215,333 | 6/1993 | Knight . |
| 5,275,468 | 1/1994 | Vacanti . |
| 5,340,198 | 8/1994 | Murphy et al. . |
| 5,421,614 | 6/1995 | Zheng . |
| 5,605,380 | 2/1997 | Gerstenberger et al. . |
| 5,692,806 | 12/1997 | Jones . |
| 5,788,282 | 8/1998 | Lewis . |

* cited by examiner

Primary Examiner—Milton Nelson, Jr.
(74) Attorney, Agent, or Firm—Vincent E. Duffy

(57) ABSTRACT

A seat belt adjuster which can be attached to the lap and shoulder belts of a conventional seat belt assembly so a passenger can adjust the positioning of the shoulder belt with respect to the passenger's upper torso. The seat belt adjuster includes a base and first and second pairs of flexible straps extending from the base. Each pair of straps can be interlocked to form first and second channels which slidably permit passage of the lap and shoulder belts therethrough. Each pair of straps can also be tighten to restrict the movement of the lap and shoulder belts through the first and second channels. In a preferred embodiment the first and second pair of straps are interlocked using Velcro strips. In an alternative embodiment a secondary locking loop, integral with one of the first or second pair of straps, is provided to strengthen the engagement of the first and second pairs of straps with the lap and shoulder belts. Additionally, foam pads are attached to both sides of the base to hinder the passage of the lap and shoulder belts through the first and second channels when the user has finished positioning the seat belt adjuster.

4 Claims, 3 Drawing Sheets

SEAT BELT ADJUSTER

RELATED APPLICATIONS

This application is a continuation-in-part of U.S. patent application Ser. No. 09/143,937 which was filed with the U.S. Patent and Trademark Office on Aug. 31, 1998 now abandoned.

FIELD OF THE INVENTION

The present invention relates to a device for attachment to motor vehicle seat belts. More particularly the present invention relates to a device for modifying the relative positions between a lap seat belt and a shoulder seat belt.

BACKGROUND OF THE INVENTION

Seat belt restraining systems are positioned in automobiles in a standard arrangement that includes a lap belt for securing a passenger's lower torso and a shoulder belt for securing a passenger's upper torso. The lap belt and shoulder belt arrangement ensures that a passenger is safely secured in the automobile. The lap belt, typically, is adjustable thereby permitting passengers of varying sizes to adjust the lap belt for personal comfort. For example, a smaller passenger may tighten his adjustable lap belt to achieve a secure fit between the lap belt and the passenger's lower torso while a larger passenger may loosen his adjustable lap belt to achieve a secure fit between the lap belt and the passenger's lower torso.

Although the standard seat belt arrangement typically includes an adjustable lap belt, the arrangement does not include an adjustable shoulder belt. More particularly, the standard seat belt arrangement does not permit a passenger to adjust the positioning of the shoulder belt across the passenger's chest and neck. For example, a passenger of shorter than average height often has the shoulder belt uncomfortably extending across the passenger's neck when the passenger buckles himself into an automobile. As a result, the passenger may forgo the use of the entire seat belt arrangement because of the discomfort caused by the shoulder belt portion of the arrangement. As can readily be appreciated, such forbearance by the passenger places the passenger at risk when the automobile is in motion.

As a consequence of the above-described situation, there has been a long standing need for a device that can be attached to the standard seat belt arrangement to enable a passenger to adjust the shoulder strap portion of the seat belt arrangement. A few inventions have attempted to meet this long standing need. U.S. Pat. No. 5,080,396 to Vacanti is directed to a clip device for seat belts. The Vacanti device can be attached to the shoulder and lap belts of a seat belt arrangement to adjust the positioning of the lap and seat belts. However, the clips of the Vacanti device are interconnected by a resilient tether member which must be kept taut to ensure that the clips are maintained in the proper positions on the shoulder and lap belts. As can be readily appreciated, if a passenger reaches forward to adjust a control on the automobile's dashboard it is likely that the resilient tether member of Vacanti will loosen thereby permitting the clip members to move. The movement of the clip members will, in turn, cause the shoulder and lap belts to move out of position on the passenger. Therefore, the Vacanti device can be easily moved out of position as a passenger shifts within the automobile.

U.S. Pat. No. 4,826,250 to Ibanez is directed to a seat belt slack adjusting device. The Ibanez device attaches to an upper portion of a shoulder belt adjacent to a support loop through which the shoulder belt passes. The support loop is typically attached to the ceiling or upper door frame of the automobile. In operation, a passenger can pull the shoulder belt until the shoulder belt is slack. Afterwards, the passenger can attach the Ibanez device to an upper portion of the shoulder belt and release the shoulder belt. As the shoulder belt is retracted by a shoulder belt retraction mechanism located near the bottom of the door frame, the Ibanez device comes into contact with the support loop. At this point the Ibanez device prevents the retraction mechanism from pulling any further length of the shoulder belt through the support loop. As a result, the shoulder belt is left in a slack condition which, presumably, enables a user to move the shoulder strap to a desired position. However, there is nothing preventing the slack shoulder belt from being moved out of position. Therefore, the Ibanez device fails to provide a means for maintaining the shoulder belt in the position desired by the passenger.

U.S. Pat. No. 4,832,367 to Lisenby is directed to a belt restraining apparatus that permits a user to adjust the position a shoulder belt. The belt restraining apparatus can be manipulated by a user to form a first loop for engaging a lap belt and a second loop for engaging a shoulder belt. Each loop is formed via hook and loop fasteners such as those sold under the "Velcro" trademark. Although the Lisenby apparatus represents an improvement over the conventional seat belt adjusters discussed above, the Lisenby apparatus has a potentially serious drawback. In particular, the hook and loop fasteners of the Lisenby apparatus are likely to disengage or "sheer" when a large force is exerted against the lap and shoulder belts. Therefore, Lisenby fails to provide a means for maintaining the shoulder belt in the position desired by the user in the event of a large force being asserted against the lap and shoulder belts.

SUMMARY OF THE INVENTION

Briefly stated, a seat belt adjuster is provided. The seat belt adjuster can be attached to the lap and shoulder belts of a conventional seat belt assembly so a passenger can adjust the positioning of the shoulder belt with respect to the passenger's upper torso. The seat belt adjuster includes a base and first and second pairs of flexible straps extending from the base. Each pair of straps can be interlocked to form first and second channels which slidably permit passage of the lap and shoulder belts therethrough. Each pair of straps can also be tighten to restrict the movement of the lap and shoulder belts through the first and second channels. In a preferred embodiment the first and second pair of straps are interlocked using Velcro strips. In an alternative embodiment a secondary locking loop, integral with one of the first or second pair of straps, is provided to strengthen the engagement of the first and second pairs of straps with the lap and shoulder belts. Additionally, foam pads are attached to both sides of the base to hinder the passage of the lap and shoulder belts through the first and second channels when the user has finished positioning the seat belt adjuster.

A feature of the present invention includes a seat belt adjuster for a seat belt configuration including a shoulder belt and a lap belt, the seat belt adjuster including a base, a first pair of flexible members extending from the base, the first pair of flexible members having releasable interlocking mechanisms on the ends thereof such that the first pair of flexible members and the base define a first channel when the releasable interlocking mechanisms are engaged, the first channel permitting passage of the shoulder belt therethrough, and a second pair of flexible members extending from the base, the second pair of flexible members having releasable interlocking mechanisms on the ends thereof such that the second pair of flexible members and the base define a second channel when the releasable interlocking mechanisms are engaged, the second channel permitting passage of the lap belt therethrough.

Another feature of the present invention includes a seat belt adjuster for a seat belt configuration including a shoulder belt and a lap belt, the seat belt adjuster having a first flexible strap having releasable interlocking mechanisms positioned thereon such that the first flexible strap forms a first channel when the interlocking mechanisms are engaged, the first channel permitting passage of the shoulder belt therethrough, and a second flexible strap connected to the first flexible strap, the second flexible strap have a main portion and an extended portion, the main portion having releasable interlocking mechanisms positioned thereon such that the main portion forms a second channel when the interlocking mechanisms are engaged, the second channel permitting passage of the lap belt therethrough, the extended portion having releasable interlocking mechanisms positioned thereon such that the extended portion forms a secondary locking loop around the first and second channels, the secondary locking loop facilitating the maintenance of the first and second channels when a force is exerted on the shoulder and lap belts.

A further feature of the present invention includes a seat belt adjuster for a seat belt configuration including a shoulder belt and a lap belt, the seat belt adjuster having a first means for engaging the shoulder belt, a second means for engaging the lap belt, the second means attached to the first means, and a third means for strengthening the engagements of the first and second means.

OBJECTS OF THE INVENTION

It is an object of the present invention to provide a seat belt adjuster which overcomes the drawbacks of the prior art described above.

It is another object of the present invention to provide a seat belt adjuster which can slidably or fixedly engage the lap and shoulder belts of a standard seat belt arrangement.

It is yet another object of the present invention to provide a seat belt adjuster which is portable.

It is still a further object of the present invention to provide a seat belt adjuster which can easily be stored in a passengers pocket, an automobiles glove compartment, or a similar storage area.

It is an even further object of the present invention to provide a seat belt adjuster having a wrap around member that maintains the engagement of the adjuster with the lap and shoulder belts.

These and other advantages of the present invention will become apparent to one skilled in the art in view of the figures and description of the figures given below.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF THE PREFERRED EMBODIMENTS

Figure 1:
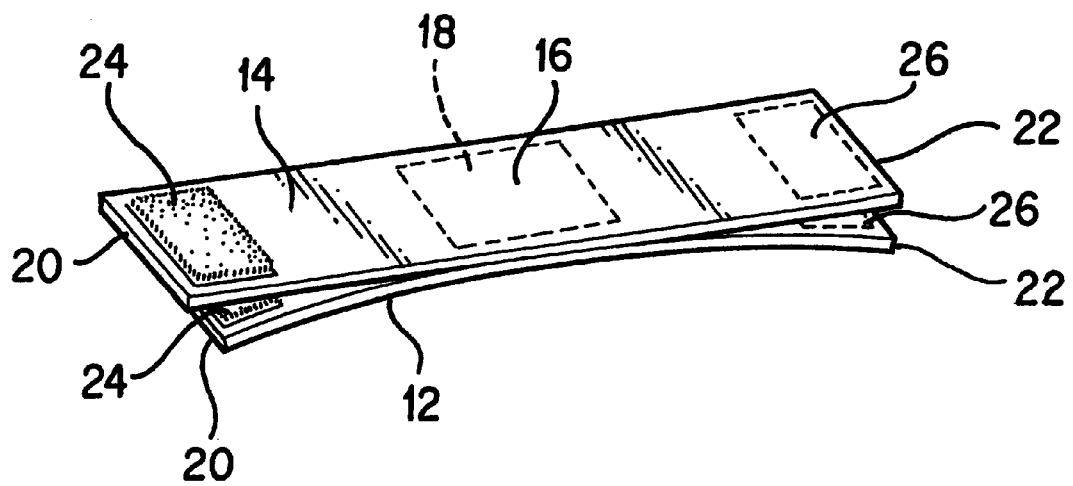
FIG. 1 is a perspective view of the seat belt adjuster of the present invention in an opened position.

Referring to FIG. 1, the seat belt adjuster 10 of the present invention is shown in an opened position. The seat belt adjuster 10 includes a first strap or band 12 and a second strap or band 14. Each strap 1 2 and 14 has a generally rectangular shape and is manufactured out of a flexible material such as nylon (e.g., nylon with a 300 psi rating). Each strap 12 and 14 is preferably 6" to 8" long and approximately 2" wide. The center portions 16 of each strap 12 and 14 are sewn together, via a nylon thread, such that a rectangular base 18 is formed. The rectangular base 18 permits the end portions 20 and 22 of each of the straps 12 and 14 to move freely and independently from one another. Male Velcro strips 24 are sewn, via a nylon thread, to upper portions (as shown in FIG. 1) of the straps 12 and 14 adjacent the free ends 20 thereof. Corresponding female Velcro strips 26 are sewn or glued to bottom portions (as shown in FIG. 1) of the straps 12 and 14 adjacent the free ends 22 thereof. The Velcro strips 24 and 26 preferably have 1"×1.5" rectangular shapes and are suitable for high-strength uses.

Figure 2:
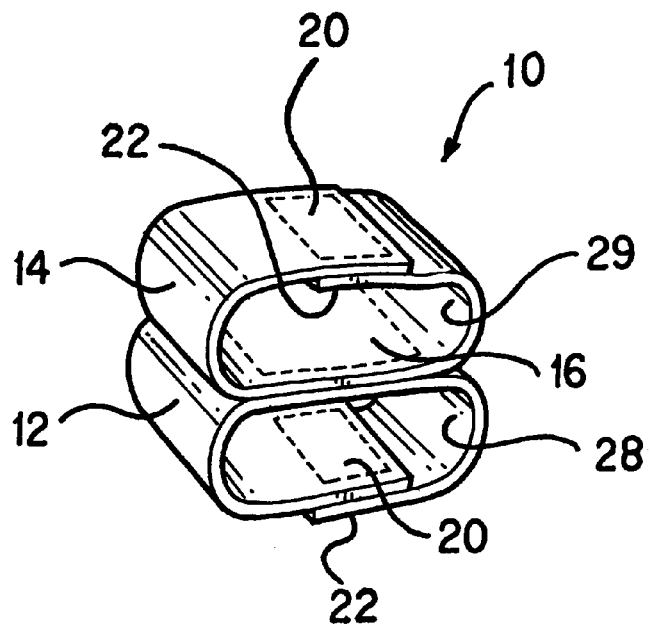
FIG. 2 is a perspective view of the seat belt adjuster of the present invention in a closed position.

Referring now to FIG. 2, the seat belt adjuster 10 of the present invention is shown in a closed position. To close the lower strap 12, a user bends the end portions 20 and 22 towards one another until the male Velcro strip 24 on the end portion 20 overlaps and aligns with the female Velcro strip 26 on the end portion 22. Afterwards, the user presses the aligned overlapping end portions 20 and 22 together until the male Velcro strip 24 engages the female Velcro strip 26.

To close the upper strap 14, a user bends the end portions 20 and 22 towards one another until the male Velcro strip 24 on the end portion 20 overlaps and aligns with the female Velcro strip 26 on the end portion 22. Afterwards, the user presses the aligned overlapping end portions 20 and 22 together until the male Velcro strip 24 engages the female Velcro strip 26.

Figure 3:
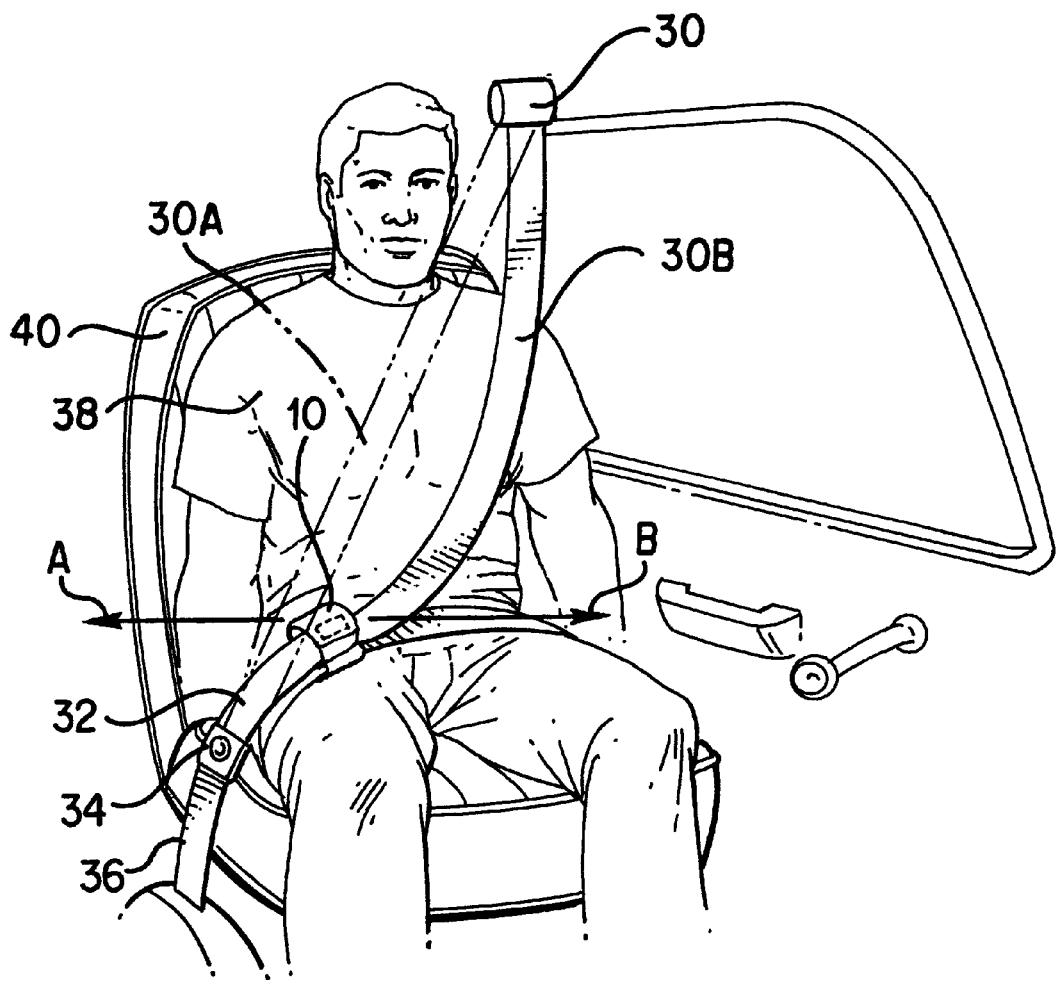
FIG. 3 is a perspective view of the seat belt adjuster of the present invention as attached to a seat belt arrangement.

In the closed position the upper and lower straps 12 and 14 define first and second belt channels 28 and 29 that permit engaged lap and shoulder belts to pass therethrough, as discussed in further detail in the description of FIG. 3.

Referring now to FIG. 3, the seat belt adjuster 10 is shown as attached to a standard automobile seat belt arrangement. The seat belt arrangement includes a shoulder belt 30 and a lap belt 32 connected to the shoulder belt 30 via a conventional seat belt release buckle 34. The release buckle 34 is adapted to attach to a male connector 36. In operation, a passenger 38 enters the automobile and positions himself in the seat 40. Afterwards, the passenger buckles himself into the seat 40 by attaching the release buckle 34 to the male connector 36. As previously described, the passenger can adjust the lap belt 32 for personal comfort, however, the shoulder belt 30 is not adjustable.

To attach the seat belt adjuster 10 to the lap belt 32 and shoulder belt 30, the passenger obtains the seat belt adjuster from storage and manipulates the adjuster 10 until it is in the open position (as shown in FIG. 1). It should be noted that the adjuster 10 is light and compact and, therefore, can be conveniently stored in a passenger's pocket, the automobile's glove compartment, or any other storage area. However, the adjuster 10 preferably remains attached to the lap belt 32 and shoulder belt 30 after attachment. The passenger then closes the seat belt adjuster 10, as shown and discussed in FIG. 2, such that the lap belt 32 is slidably positioned within the first belt channel 28 and the shoulder belt 30 is slidably positioned within the second belt channel 29.

To adjust the shoulder belt 30 from the uncomfortable "standard" position 30A that it occupies in the standard seat belt arrangement, the passenger slides the seat belt adjuster 10 towards (arrow A) or away from (arrow B) the release buckle 34 until the shoulder belt 30 rests in a more comfortable position 30B across the passengers upper torso and neck. If the passenger wants to maintain the shoulder belt 30 in the selected position 30B, the passenger can tighten the seat belt adjuster 10 so the lap belt 32 and the shoulder belt 30 are fixedly positioned within the first and second belt channels 28 and 29. To tighten the seat belt adjuster 10 the passenger opens and closes the lower and upper straps 12 and 14 so the closed straps 12 and 14 define narrow channels 28 and 29 that the shoulder and lap belts 30 and 32 cannot slidably pass through. Although a user may tighten the seat belt adjuster 10, it should be noted that, due to friction, the seat belt adjuster 10 is not prone to movement after it is positioned by the passenger.

Figure 4:
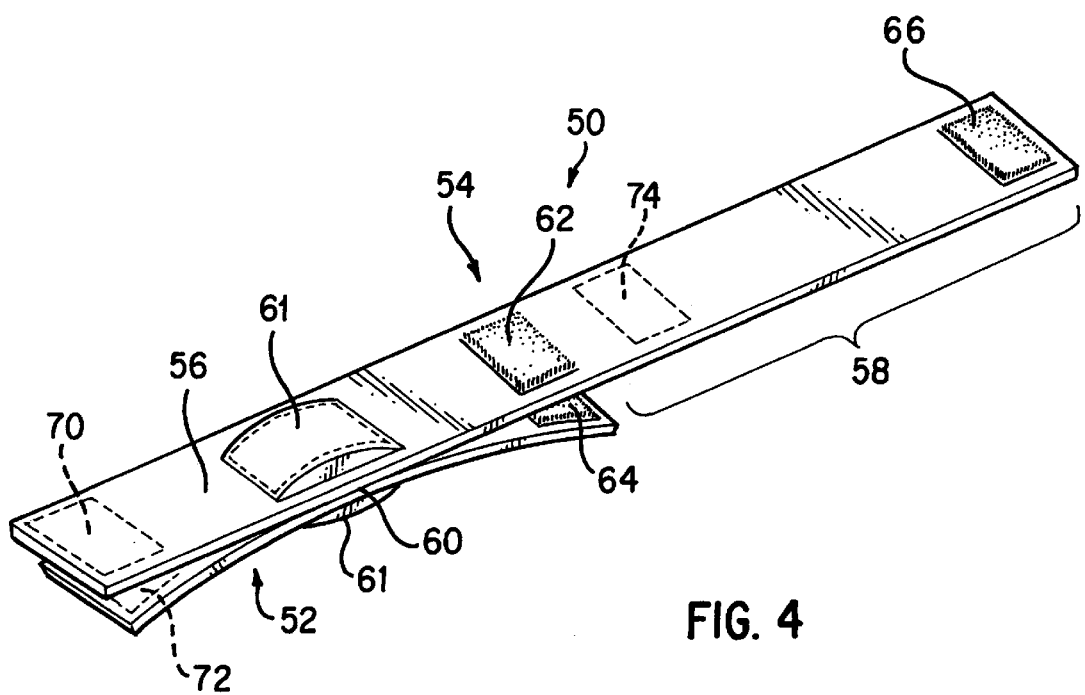
FIG. 4 is a perspective view of an alternative embodiment of the present invention in an opened position.

Referring now to FIG. 4, an alternative embodiment of the seat belt adjuster 50 of the present invention is shown in an opened position. The seat belt adjuster 50 includes a first strap or band 52 and an elongated second strap or band 54 having a main portion 56 and an extended portion 58. Straps 52 and 54 have generally rectangular shapes and are manufactured out of a flexible material such as nylon (e.g., nylon with a 300 psi rating). Strap 52 is preferably 6"to 8" long and approximately 2" wide. The main portion 56 of strap 54 is preferably the same length as strap 52. The extended portion 58 of strap 54 is preferably 8" to 10" long. Center regions of the first strap 52 and the main portion 56 of strap 54 are sewn together, via a nylon thread, to form a base 60. The base 60 permits the end portions of straps 52 and 54 to move freely and independently from one another.

Foam pads 61 are attached to straps 52 and 54 adjacent base 60. Foam pads 61 facilitate the ability of seat belt adjuster 50 to engage the lap and shoulder belts of an automobile, as discussed below.

Male Velcro strips 62, 64, and 66 are sewn, via a nylon thread, to upper portions (as shown in FIG. 4) of the straps 52 and 54. Corresponding female Velcro strips 70, 72 and 74 are sewn or glued to bottom portions (as shown in FIG. 4) of the straps 52 and 54. The Velcro strips 62–66 and 70–74 preferably have 1"×1.5" rectangular shapes and are suitable for high-strength uses.

Figure 5:
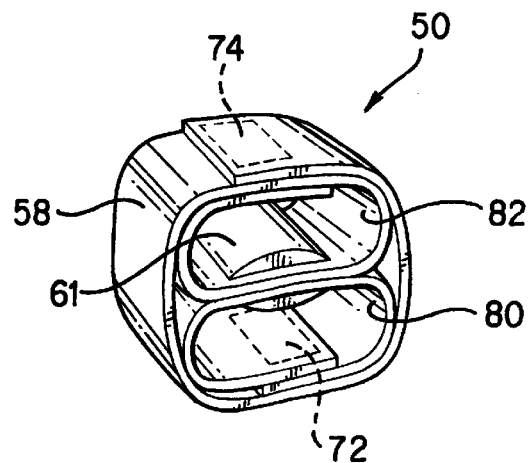
FIG. 5 is a perspective view of the seat belt adjuster of FIG. 4 in a closed portion.

Referring now to FIG. 5, the seat belt adjuster 50 is shown in a closed position. In the closed position, strap 52 forms a belt channel 80, main portion 56 of strap 54 forms a belt channel 82, and extended portion 58 of strap 54 wraps around belt channels 80 and 82 to form a secondary locking loop that maintains channels 80 and 82 from opening if a force is exerted on strap 52 and main portion 56 of strap 54, e.g., if the automobile suddenly stops.

To close strap 52, the user bends the end portions of strap 52 until male Velcro strip 64 overlaps and aligns with female Velcro strip 72. Afterwards, the user presses the Velcro strips 64 and 72 together to place them in an engaged position.

To close main portion 56 of strap 54, the user bends strap 54 until male Velcro strip 62 overlaps and aligns with female Velcro strip 70. Afterwards, the user presses the Velcro strips 62 and 70 together to place them in an engaged position.

To close extended portion 58 of strap 54, the user wraps the extended portion 58 of strap 54 around belt channels 80 and 82 until male Velcro strip 66 overlaps and aligns with female Velcro strip 74. Afterwards, the user presses the aligned overlapping strips 66 and 74 together to place them in an engaged position.

In the closed position the seat belt adjuster 50 engages lap and shoulder belts as discussed in the description of FIG. 3. In addition, foam pads 61 prevent seat belt adjuster 50 from slipping out of position after the seat belt adjuster 50 has been attached to the lap and shoulder belts of an automobile. Furthermore, extended portion 58 of seat belt adjuster 50 facilitates the maintenance of channels 80 and 82 by providing a secondary locking loop that prevents Velcro strips 62, 64, 70, and 72 from disengaging or "peeling" when a sudden force is exerted against the lap and shoulder belts 32 and 30.

While the present invention has been described with reference to preferred embodiments, it is apparent that various changes may be made in the embodiments without departing from the spirit and scope of the invention, as defined by the appended claims. For example, while male and female Velcro strips have been disclosed as the locking mechanism for the seat belt adjuster, any other conventional locking mechanism (such as snaps, buttons, etc...) may be used to maintain the adjuster in the closed position without departing from the spirit and scope of the invention.

List of Reference Numerals:

| | | | |
|---|---|---|---|
| 10 | seat belt adjuster | 50 | seat belt adjuster |
| 12 | first strap | 52 | first strap |
| 14 | second strap | 54 | second strap |
| 16 | center portions of strap | 56 | main portion of second strap |
| 18 | rectangular base | 58 | extended portion of second strap |
| 20 | end portion of strap | 60 | base |
| 22 | end portion of strap | 61 | foam pad |
| 24 | male Velcro strip | 62 | male Velcro strip |
| 26 | Female Velcro strip | 64 | male Velcro strip |
| 28 | first belt channel | 66 | male Velcro strip |
| 29 | second belt channel | 70 | female Velcro strip |
| 30 | shoulder strap | 72 | female Velcro strip |
| 30A | standard position | 74 | female Velcro strip |
| 30B | selected position | 80 | first channel |
| 32 | lap belt | 82 | second channel |
| 34 | release buckle | | |
| 36 | male connector | | |
| 38 | passenger | | |
| 40 | seat | | |

What is claimed is:

1. A seat belt adjuster for a seat belt configuration including a shoulder belt and a lap belt, said seat belt adjuster comprising:

a first flexible strap having releasable interlocking mechanisms positioned thereon such that said first flexible strap forms a first channel when said interlocking mechanisms are engaged, said first channel permitting passage of said shoulder belt therethrough; and a second flexible strap connected to said first flexible strap, said second flexible strap have a main portion and an extended portion, said main portion having releasable interlocking mechanisms positioned thereon such that said main portion forms a second channel when said interlocking mechanisms are engaged, said second channel permitting passage of said lap belt therethrough, said extended portion having releasable interlocking mechanisms positioned thereon such that said extended portion forms a secondary locking loop around said first and second channels, said secondary locking loop facilitating the maintenance of said first and second channels when a force is exerted on said shoulder and lap belts.

2. The seat belt adjuster of claim 1 wherein said releasable interlocking mechanisms are hook and loop fasteners.

3. The seat belt adjuster of claim 1 further comprising a foam pad attached to said first flexible strap such that said foam pad is adapted to engage said shoulder belt when said flexible first strap forms said first channel, said foam pad hindering the passage of said shoulder belt through said first channel.

4. The seat belt adjuster of claim 1 further comprising a foam pad attached to said main portion of said second flexible strap such that said foam pad engages said lap belt when said main portion of said second flexible strap forms said second channel, said foam pad hindering the passage of said lap belt through said second channel.

* * * * *